United States Patent
Yamada

[11] Patent Number: 6,061,185
[45] Date of Patent: May 9, 2000

[54] PROJECTION LENS HAVING ALL GLASS LENSES IN A SECOND LENS GROUP

[75] Inventor: Hiroshi Yamada, Omiya, Japan

[73] Assignee: Fuji Photo Optical Co., Ltd., Saitama, Japan

[21] Appl. No.: 09/024,584

[22] Filed: Feb. 17, 1998

[30] Foreign Application Priority Data

Mar. 7, 1997 [JP] Japan .................................. 9-070403

[51] Int. Cl.[7] .................................................. G02B 3/00
[52] U.S. Cl. .......................................................... 359/650
[58] Field of Search ................................. 359/649, 650, 359/708, 714, 715

[56] References Cited

U.S. PATENT DOCUMENTS

| | | | |
|---|---|---|---|
| 4,989,961 | 2/1991 | Yoshioka ................................. | 359/649 |
| 5,272,540 | 12/1993 | Hirata et al. ............................ | 358/237 |
| 5,367,405 | 11/1994 | Sado ........................................ | 359/649 |
| 5,572,364 | 11/1996 | Toide et al. .............................. | 359/649 |
| 5,659,424 | 8/1997 | Osawa et al. ............................ | 359/649 |

FOREIGN PATENT DOCUMENTS 6-242372  9/1994  Japan .

*Primary Examiner*—Ricky Mack
*Attorney, Agent, or Firm*—Snider & Associates; Ronald R. Snider

[57] ABSTRACT

Four groups of six lenses comprising a plastic lens having weak refracting power, three glass lenses of convex, concave, and convex yielding a major part a refracting power of the projection lens as a whole, a plastic lens having a weak refracting power, and a lens having a concave surface directed onto the screen side are successively disposed from the screen side, whereby the plastic lens with a temperature-correcting function is omitted, thus cutting down cost. Successively disposed from the screen side are $G_1$ made of a plastic lens $L_1$ having a weak refracting power and at least one aspheric surface, $G_2$ made of three glass lenses of convex, concave, and convex $L_2$ to $L_4$ yielding a major part of the refracting power of the projection lens as a whole, $G_3$ made of a plastic lens $L_5$ having a weak refracting power and at least one aspheric surface, and $G_4$ made of a lens $L_6$ having at least one aspheric surface and a concave surface directed onto the screen side.

6 Claims, 4 Drawing Sheets

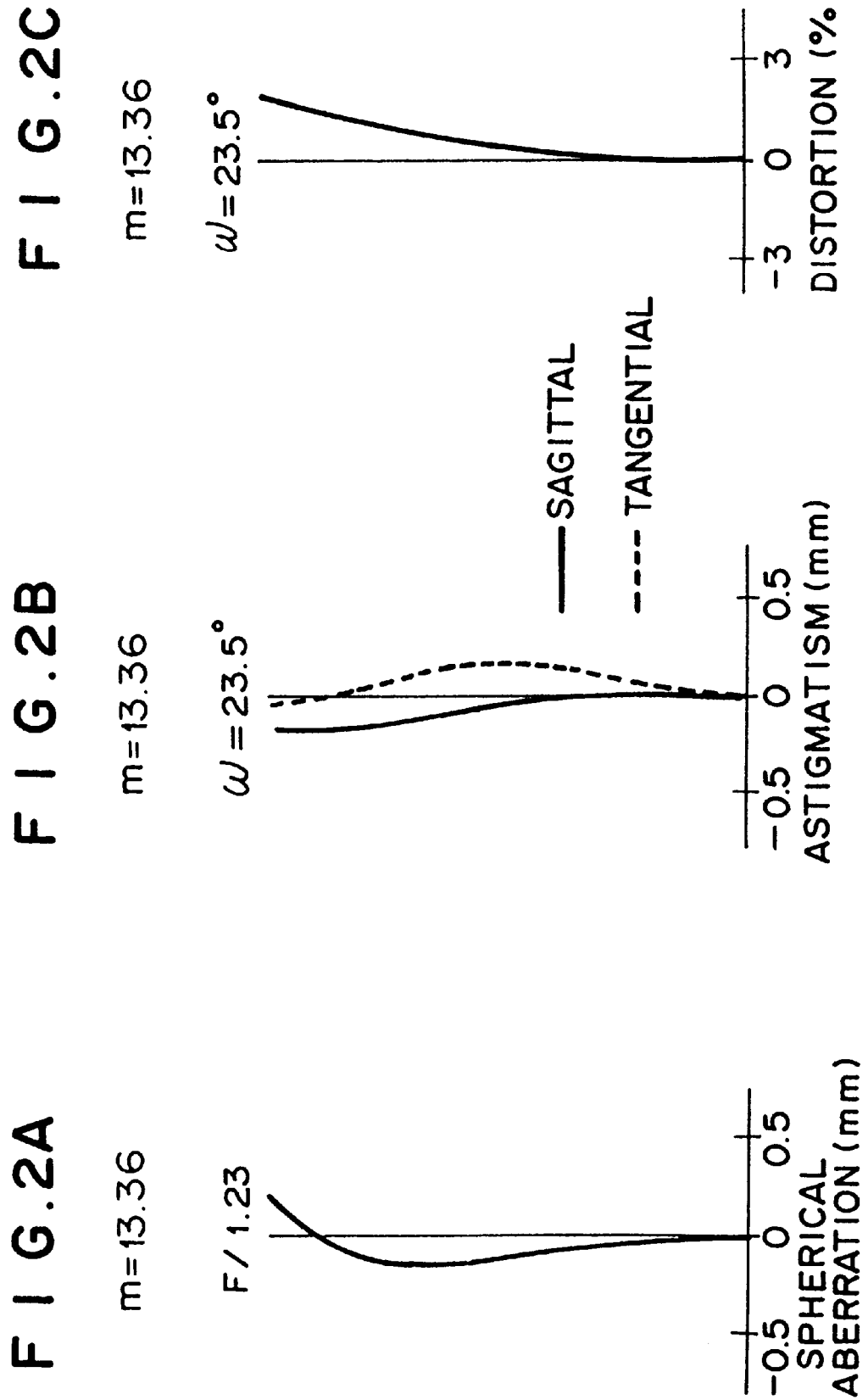

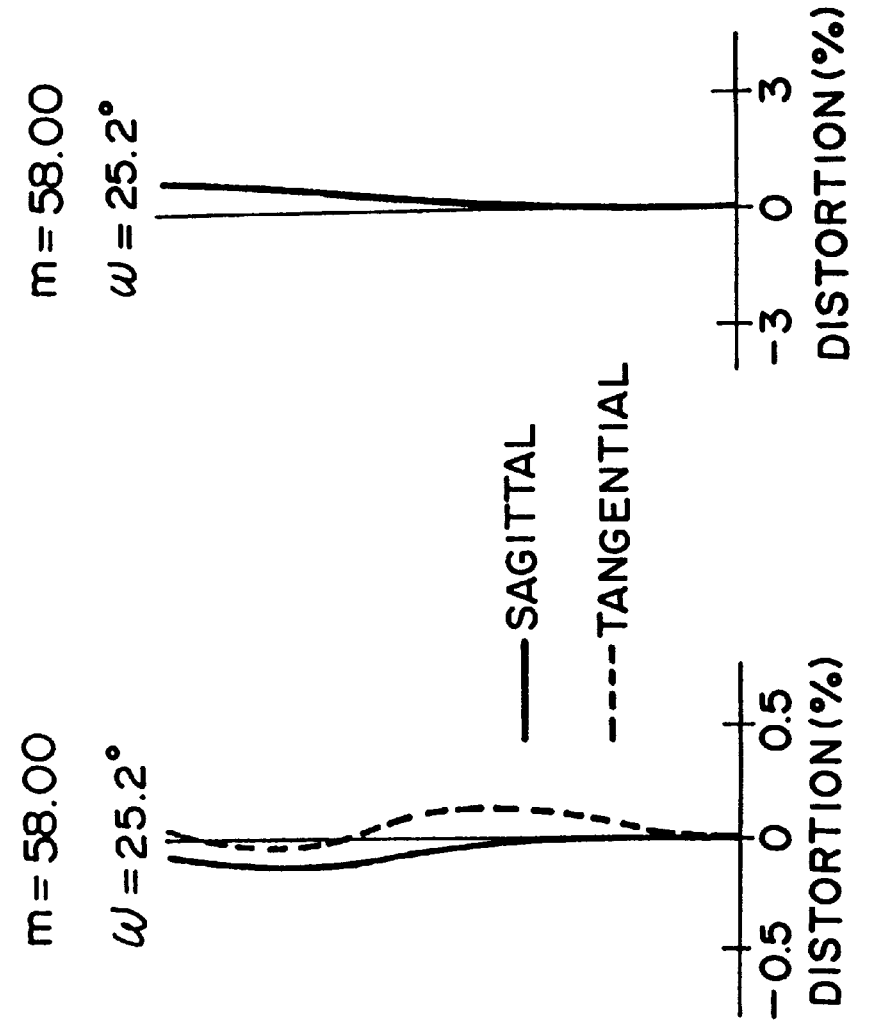

PROJECTION LENS HAVING ALL GLASS LENSES IN A SECOND LENS GROUP

RELATED APPLICATIONS

This application claims the priority of Japanese Patent Application No. 9-70403 filed on Mar. 7, 1997, which is incorporated herein by reference.

BACKGROUND OF THE INVENTION

1. Field of the Invention

The present invention relates to a projection lens for a video projector which is used for projecting onto a large-size screen an image displayed on a projection tube (CRT) or the like; and, in particular, to a so-called optical coupling type (OC type) projection lens in which the space between the lens and CRT is filled with a liquid in order to increase contrast ratio or enhance cooling efficiency of the CRT.

2. Description of the Prior Art

Video projectors, by which an image displayed on a CRT surface or the like is projected onto a large-size screen by means of a projection lens, have often been used in theaters, exhibition halls, airplanes, and the like in recent years.

Preferably used as a projection lens for a video projector is that of OC type which is excellent in cooling efficiency and contrast ratio.

Also, the video projector is used as a terminal for displaying computer graphics images or the like as well as images from VTR, video cameras, and received TV images. It is required for the video projector to have a projection magnification of 10× to 60× and be inexpensive.

In an OC type projection lens, the liquid within its liquid optical coupler becomes quite hot due to the heat of the CRT surface, thereby causing the lens housing to expand. Consequently, the attaching position of the projection lens may vary, thus defocusing its projected image.

Therefore, a projection lens is proposed in commonly-assigned Japanese Unexamined Patent Publication No. 6-242372 as an optical coupling type projection lens which can correct the defocusing of projected image caused by increase in temperature and can secure a power-variable range of at least about 60× in the case where it is applied to a front-screen type projector.

The projection lens disclosed in Japanese Unexamined Patent Publication No. 6-242372 actively utilizes a plastic lens whose refractive index greatly varies upon increase in temperature, and adjusts the position and refractive index of the plastic lens so as to correct the defocusing of projected image caused by increase in temperature.

In this projection lens, however, since its temperature-correcting plastic lens has a power, in order to prevent lens performances from deteriorating due to changes in projection magnification, it is necessary to use other plastic lenses having a weaker power as well.

Accordingly, the projection lens as a whole comprises nine to ten lenses, thereby increasing its manufacturing cost.

Meanwhile, while the temperature of the liquid within the liquid optical coupler rises due to the heat of the CRT surface when the CRT is turned on as mentioned above, it has been known that the liquid temperature becomes substantially constant after it rises from room temperature by about 40° C.

Accordingly, in the case where focusing is effected beforehand or again at the point of time when the temperature of the liquid within the liquid optical coupler becomes substantially constant, the temperature-correcting plastic lens can be omitted.

SUMMARY OF THE INVENTION

In view of such circumstances, it is an object of the present invention to provide an optical coupling type projection lens in which a plastic lens for correcting the defocusing of its projected image caused by increase in temperature is omitted, thus reducing the number of its constituent lenses, whereby its cost can be cut down.

The projection lens in accordance with the present invention is a projection lens for projecting onto a screen an image of a projection tube, composed of four lens groups comprising, successively from the screen side, a first lens group made of a plastic lens having a weak refracting power and at least one aspheric surface; a second lens group made of a glass lens substantially influential to a refracting power of the projection lens as a whole; a third lens group made of a plastic lens having a weak refracting power and at least one aspheric surface; and a fourth lens group having at least one aspheric surface and a concave surface directed onto the screen side, the fourth lens group constituting between the fourth lens group and the projection tube a liquid optical coupler in which a liquid is sealed.

Preferably, the second lens group comprises, successively from the screen side, convex, concave, and convex glass lenses.

Preferably, when the power of the projection lens is being varied, the first, second, and third lens groups are moved by distances different from each other so as to adjust focusing.

Here, "weak refracting power" means a refracting power which is weaker than that of the second lens group and does not considerably influence the refracting power of the whole projection lens.

Also, "substantially influential to a refracting power of the projection lens as a whole" means having a refracting power at least nearly half as much as the refracting power of the whole projection lens.

In general, when power is varied in a wide range in an OC type projection lens, both images in the center part and peripheral part of a picture deteriorate. In the projection lens of the present invention, since no correction has to be taken into account upon changes in temperature, the first and second lens groups are caused to have weak powers and function as aberration-correcting plate using an aspheric surface, thereby correcting the deterioration in image quality occurring when the projection magnification is changed.

Namely, the defocusing of projected image caused by changes in temperature is corrected by effecting focusing beforehand or again at the point of time when the temperature of the liquid within the liquid optical coupler becomes substantially constant.

The second lens group, which occupies a major part of the refracting power of the whole system, is used for focusing and power variation. The peripheral image of picture that deteriorates at this time is corrected when the distance between the first and second lens groups is changed, whereas the image of the center part of the picture is corrected when the distance between the second and third lens groups is changed.

Preferably, in the second lens group, convex, concave, and convex lenses are successively disposed from the screen side.

It is due to the fact that, when concave, convex, and convex lenses are successively disposed from the screen side, the outer diameter of the lenses subsequent to the concave lens increases so that not only the costs for glass materials and processing increase but also the projection lens as a whole has a larger size.

It is also because of the fact that, when convex, convex, and concave lenses are successively disposed from the screen side, the coma and spherical aberration occurring in the second lens group cannot fully be corrected by the first and third lens groups.

BRIEF DESCRIPTION OF THE DRAWINGS

FIGS. 2A, 2B and 2C are aberration charts of the projection lens (m=13.36) in accordance with the example of the present invention;

FIGS. 4A, 4B and 4C are aberration charts of the projection lens (m=58.00) in accordance with the example of the present invention.

DESCRIPTION OF THE PREFERRED EMBODMIENTS

Figure 1:
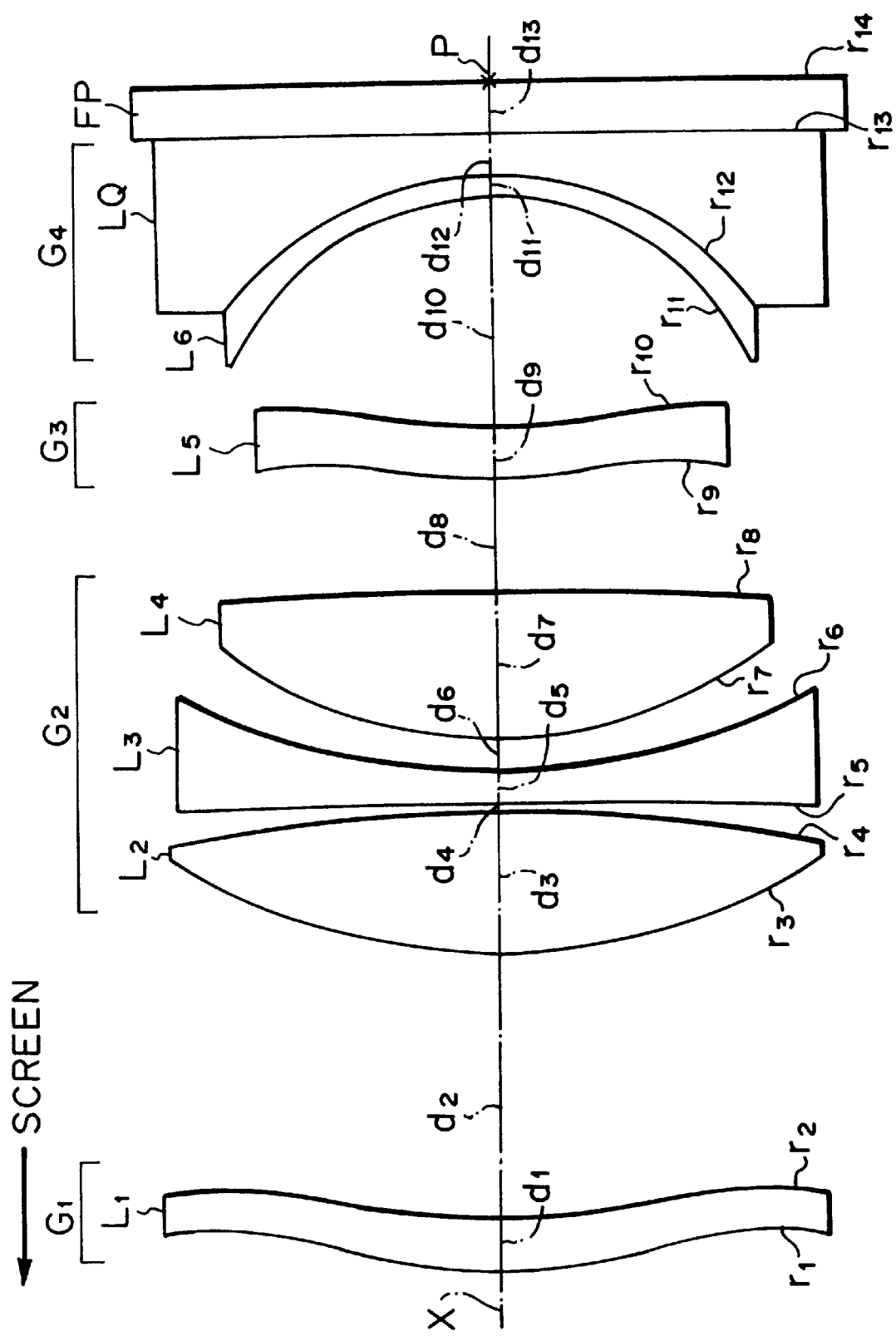
FIG. 1 is a sectional view showing a projection lens in accordance with an example of the present invention.

In the following, an embodiment of the present invention will be explained with reference to the accompanying drawings.

In the following example, letters used in the drawings and tables are defined as follows:

| | |
|---|---|
| f | focal length of projection lens |
| F | F number |
| m | projection magnification |
| ω | half angle of view |
| $r_1, r_2, \ldots, r_n$ | radius of curvature of each lens and faceplate |
| $d_1, d_2, \ldots, d_n$ | axial thickness or air and liquid gap of each lens and faceplate |
| $n_d$ | refractive index of each lens with respect to d-line |
| $v_d$ | Abbe number of each lens at d-line |
| X | optical axis |

Here, each aspheric surface is indicated by *; and, assuming that the optical axis direction is z axis direction and a direction perpendicular thereto is y axis direction, its form is represented by: Equation 1

$$z = \frac{Cy^2}{1+\sqrt{1-kC^2 y^2}} + A_4 y^4 + A_6 y^6 + A_8 y^8 + A_{10} y^{10}$$

wherein C is an apex curvature (reciprocal of radius of curvature), k is eccentricity, and $A_4$, $A_6$, $A_8$, and $A_{10}$ are aspheric surface coefficients.

The projection lens in accordance with an example shown in FIG. 1 comprises, successively from the screen side, a first lens group $G_1$ made of a plastic lens $L_1$ having a weak refracting power, both surfaces of which are aspheric surfaces; a second lens group $G_2$ made of three sheets of glass lenses $L_2$ to $L_4$, which are respectively convex, concave, and convex, substantially influential to the refracting power of the projection lens as a whole; a third lens group $G_3$ made of a plastic lens $L_5$ having a weak refracting power, both surfaces of which are aspheric surfaces; and a fourth lens group $G_4$ made of a negative lens $L_6$ having a concave aspheric surface directed onto the screen side.

The fourth lens group $G_4$ seals between it and a projection tube (CRT) FP a liquid LQ, thereby constituting a liquid optical coupler.

When varying power, the first lens group $G_1$, second lens group $G_2$, and third lens group $G_3$ move by amounts different from each other, thus adjusting focus, and surface gaps $d_2$, $d_8$, and $d_{10}$ vary depending on magnification.

Table 1 (follows) shows the configuration and characteristic of the projection lens in accordance with this example.

Table 2 (follows) shows the distance $d_2$ between the first lens group $G_1$ and second lens group $G_2$, distance $d_8$ between the second lens group $G_2$ and third lens group $G_3$, and distance $d_{10}$ between third lens group $G_3$ and fourth lens group $G_4$ at each magnification (m).

Table 3 (follows) shows aspheric surface coefficients $A_4$, $A_6$, $A_8$, and $A_{10}$ and eccentricity k in each of the aspheric surfaces $r_1$, $r_2$, $r_9$, $r_{10}$, and $r_{11}$.

Figure 3C:
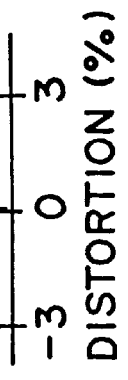
FIGS. 3A, 3B and 3C are aberration charts of the projection lens (m=22.73) in accordance with the example of the present invention.
Figure 3B:
Figure 3A:
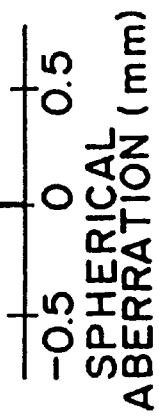

FIGS. 2 to 4 show spherical aberration, astigmatism, and distortion in the example. These aberration charts respectively show each aberration state at three magnifications indicated in Table 2.

As can be seen from these aberration charts, the projection lens in accordance with this example maintains favorable optical performances over a wide variable power range.

As explained in the foregoing, in accordance with the projection lens of the present invention, the defocusing of projected image caused by changes in temperature is corrected by effecting focusing beforehand or again at the point of time when the temperature of the liquid within the liquid optical coupler becomes substantially constant, whereby the plastic lens for temperature correction is omitted.

Consequently, the number of constituent lenses can be reduced, thus allowing its cost to decrease.

Also, the first, second, and third lens groups are made movable by amounts different from each other, and a larger variable power is attained as the second lens group is mainly moved. The peripheral image of picture that deteriorates when the power thus varies is corrected when the distance between the first and second lens groups is changed, whereas the image of the center part of the picture is corrected when the distance between the second and third lens groups is changed.

Therefore, a variable power range where the image quality does not deteriorate can be made larger, thus allowing a variable power range suitable for a front-screen type video projector to be secured.

TABLE 1

| Surface | | r (mm) | d (mm) | $n_d$ | $v_d$ |
|---|---|---|---|---|---|
| 1 | * | 116.5818 | 10.00000 | 1.4910 | 57.6 |
| 2 | * | 149.1460 | Variable | | |
| 3 | | 117.7128 | 28.72193 | 1.5891 | 61.2 |
| 4 | | −327.9473 | 1.00422 | | |
| 5 | | −1952.6521 | 6.50411 | 1.8052 | 25.5 |
| 6 | | 133.5159 | 6.73983 | | |
| 7 | | 87.2099 | 29.87162 | 1.5891 | 61.2 |
| 8 | | −1095.4390 | Variable | | |
| 9 | * | 133.4135 | 10.00000 | 1.4910 | 57.6 |
| 10 | * | 130.0155 | Variable | | |
| 11 | * | −55.1509 | 4.00000 | 1.5067 | 50.2 |
| 12 | | −66.4700 | 8.00000 | 1.4383 | 60.7 |
| 13 | | 0.0 | 10.30000 | 1.5688 | 56.0 |
| 14 | | 0.0 | 0.0 | | |

TABLE 2

| Magnification m | 13.36 | 22.73 | 58.00 |
|---|---|---|---|
| $d_2$ | 53.472 | 52.019 | 50.363 |
| $d_8$ | 21.564 | 22.546 | 23.668 |
| $d_{10}$ | 48.495 | 44.028 | 39.444 |

TABLE 3

| Surface | k | $A_4$ | $A_6$ | $A_8$ | $A_{10}$ |
|---|---|---|---|---|---|
| 1 | 1.0000000 | −0.2715190E − 06 | −0.1066398E − 09 | −0.1086259E − 13 | 0.2872017E − 17 |
| 2 | 1.0000000 | −0.1819931E − 06 | −0.1265557E − 09 | 0.3076731E − 15 | 0.1973677E − 17 |
| 9 | 1.0000000 | −0.7606231E − 06 | −0.4117777E − 09 | −0.3939333E − 13 | 0.4065615E − 16 |
| 10 | 1.0000000 | −0.2399303E − 06 | −0.5268678E − 09 | 0.6518539E − 13 | 0.1403711E − 16 |
| 11 | 1.0000000 | 0.4958181E − 06 | 0.1829423E − 10 | −0.4928216E − 13 | 0.1073369E − 16 |

What is claimed is:

1. A projection lens for projecting onto a screen an image of a projection tube, said projection lens being composed of four lens groups comprising, successively from the screen side:

a first lens group made of a plastic lens having a refracting power less than a second lens group and at least one aspheric surface;

wherein said second lens group is made of a glass lens having a refracting power at least nearly half as much as the refracting power of the projection lens as a whole;

a third lens group made of a plastic lens having a refracting power less than the second lens group and at least one aspheric surface; and a fourth lens group having at least one aspheric surface and a concave surface directed onto the screen side;

said fourth lens group constituting between said fourth lens group and said projection tube a liquid optical coupler in which a liquid is sealed.

2. A projection lens according to claim 1, wherein said second lens group comprises, successively from the screen side, convex, concave, and convex glass lenses.

3. A projection lens according to claim 1, wherein when varying the power of said projection lens, said first, second, and third lens groups are moved by distances different from each other so as to adjust focusing.

4. A projection lens according to claim 1, wherein said lens group consists of successively from the screen side, convex, concave and convex lenses.

5. A projection lens according to claim 1, wherein said second lens group consists of three lenses.

6. A projection lens according to claim 4, wherein said second lens group consists of glass lenses.

* * * * *

UNITED STATES PATENT AND TRADEMARK OFFICE
CERTIFICATE OF CORRECTION

PATENT NO.      : 6,061,185
DATED           : May 9, 2000
INVENTOR(S)     : Hiroshi, Yamada It is certified that error appears in the above-identified patent and that said Letters Patent is hereby corrected as shown below:

<u>Title page,</u>
Item [22], the filing date "Feb. 17, 1998" should read -- Feb. 18, 1998 --.

Signed and Sealed this

Second Day of April, 2002

Attest:

Attesting Officer

JAMES E. ROGAN
Director of the United States Patent and Trademark Office